United States Patent [19]

Loggins

[11] Patent Number: 4,950,517

[45] Date of Patent: Aug. 21, 1990

[54] BILATERAL ADHESIVE ASSEMBLY

[75] Inventor: C. Jim Loggins, Sheboygan, Wis.

[73] Assignee: Mayline Company, Inc., Sheboygan, Wis.

[21] Appl. No.: 227,518

[22] Filed: Aug. 1, 1988

[51] Int. Cl.[5] .......... B32B 7/00

[52] U.S. Cl. .......... 428/40; 428/202; 428/352; 156/249

[58] Field of Search .......... 248/463, 205.3; 428/40, 428/41, 42, 198, 352, 202, 914, 212, 354; 156/289, 247, 249, DIG. 33, 241, 344; 40/662, 446

[56] References Cited

U.S. PATENT DOCUMENTS

| | | | |
|---|---|---|---|
| 1,875,766 | 9/1932 | Schubert | 428/198 |
| 2,292,024 | 8/1942 | Dreher | 428/352 |
| 3,001,906 | 9/1961 | Capella et al. | 156/DIG. 33 |
| 3,261,126 | 7/1966 | Marks | 248/205.3 |
| 4,182,789 | 1/1980 | Castelluzzo | 428/212 |
| 4,285,999 | 8/1981 | Oliveri et al. | 428/41 |
| 4,310,137 | 1/1982 | Frye | 248/205.3 |
| 4,574,098 | 3/1986 | Sampson | 428/212 |
| 4,621,732 | 11/1986 | Olson | 428/40 |

FOREIGN PATENT DOCUMENTS

| | | | |
|---|---|---|---|
| 1063305 | 8/1959 | Fed. Rep. of Germany | 428/202 |

*Primary Examiner*—Michael W. Ball
*Assistant Examiner*—Louis Falasco
*Attorney, Agent, or Firm*—Ronald B. Sefrna

[57] ABSTRACT

The present invention discloses a bilateral adhesive assembly adapted to the primary purpose of removeably adhering a sheet of drafting paper or drafting film to a drafting board. The adhesive assembly of the invention generally comprises an elongate adhesive inhibiting carrier tape, a plurality of preferably rectangular stickers substantially coated on one side and partially coated on the opposite side with a pressure sensitive adhesive compound and contiguously disposed along the carrier tape with the substantially coated side in contact with the carrier tape, and a plurality of adhesive inhibiting protective tabs each disposed over the pressure sensitive adhesive compound on the partially coated side of each of the stickers. The adhesive assembly is formed into a roll and is preferably provided in a dispenser box suitable for dispensing individual stickers from the roll.

14 Claims, 2 Drawing Sheets

BILATERAL ADHESIVE ASSEMBLY

FIELD OF THE INVENTION

The present invention generally relates to adhesives, and more specifically relates to an bilateral adhesive assembly particularly adapted to the purpose of removably adhering a sheet of drafting paper or drafting film to a drafting board.

BACKGROUND OF THE INVENTION

It is an almost universal practice for draftsmen and artists to perform their work on a sheet of paper or other medium such as a drafting film which is removeably attached to a flat board or table. With the use of modern drafting equipment it is important that the drafting medium be firmly attached to the drafting board in a fixed position so that it does not shift position during use, but is, at the same time, readily removeable from the drafting board. A number of different methods of attaching the drafting medium to the drafting board have been used and are well known in the prior art, but each such approach has presented certain distinct disadvantages.

One approach is the use of a tack or pin to hold each corner of the drafting medium to the drafting board by penetrating the drafting medium with the shaft of the pin and embedding the point of the pin in the drafting board. Over a period of time the holes produced in the drafting medium tend to enlarge, destroying the integrity of attachment of the medium to the board and allowing the position of the medium to shift, and eventually tearing through the drafting medium. In addition, the extension of the pin or tack above the surface of the drafting medium makes it difficult to move drafting instruments over the corners and edges of the drafting medium.

Another approach has utilized tape to slick the corners of the drafting medium to the drafting board, commonly by placing a strip of single sided adhesive tape over each corner of the medium and adhering the ends of the strip of tape to the board. This method eliminates some of the disadvantages of the use of tacks or pins, but introduces other disadvantages. The primary difficulties are the tendency of the tape to roll up with passage of drafting instruments over it, and the need to remove the strips of tape each time the drafting medium is moved. In a varient of this method, fully coated bilaterally adhesive tape or other adhesive compound is placed between the drafting medium and the drafting board. With the use of fully coated bilaterally adhesive tape difficulty often arises when the drafting medium is removed from the drafting board, such as tearing of the medium or removal of the tape from the drafting board along with the sheet of drafting medium. The use of an adhesive compound without a flat substrate tape often produces a lump of adhesive compound between the drafting medium and the drafting board, creating problems with the smooth passage of drafting instruments over the corners of the medium.

Thus, there remains a need in the drafting field for an approach to the attachment of drafting media to a drafting board or table which maintains a firm and secure adhesion without the disadvantages of the prior art.

SUMMARY OF THE INVENTION

The present invention provides a bilateral adhesive assembly particularly adapted to the primary purpose of removeably adhering a sheet of drafting medium to a drafting board or table such that the medium is firmly and smoothly secured to the board without the extension of the means of adhesion above the surface or beyond the edges of the drafting medium, while allowing the drafting medium to be readily removed from the board without the coincident removal of the means of adhesion from the board.

The adhesive assembly of the invention comprises an adhesive inhibiting carrier medium, a plurality of discrete stickers coated on a first side with a pressure sensitive adhesive compound and coated on a second side with a pressure sensitive adhesive compound, disposed contiguously on the carrier medium, and a plurality of discrete adhesive inhibiting tabs each disposed on one of the stickers over the exposed portion of the sticker coated with the adhesive compound to protect against premature adhesion. The carrier medium comprises a flat substrate bilaterally coated with a material which repells or inhibits the pressure sensitive adhesive compound used with the sticker component of the assembly. In the preferred embodiment of the invention the substrate is paper, but any suitably flexible material of construction may be used.

Each sticker comprises a flat substrate which is coated on a first side with a pressure sensitive adhesive compound, and coated on the opposite, second, side with a pressure sensitive adhesive compound, such that the strength of the adhesive bond which can be formed between the first side of each sticker and another material is greater than the strength of the adhesive bond which can be formed between the second side of each sticker and that other material. Each sticker is preferably rectangular in configuration, with a width and a length of any convenient dimension to allow the placement of sufficient amounts of adhesive compound on the substrate of the sticker to achieve secure adhesion of the first side of the sticker to the drafting board and of the drafting medium to the second side of the sticker. The stickers are disposed contiguously on the carrier medium with the first side of the stickers in contact with the carrier medium. The adhesive compound should develop a mild adhesion to the carrier medium sufficient to retain the stickers thereon while offering little resistance to removal of the stickers from the carrier medium. In some embodiments, the adhesive compound coating may be omitted from a strip along one edge of the second side or of both sides of each sticker, to facilitate removal of each sticker from the carrier tape and to allow handling of each sticker without contacting the adhesive compound with the fingers. In the embodiments in which a narrow strip of substrate on both sides of each sticker is left uncoated, the uncoated portions of each side of each sticker should be along the same edge of each sticker.

The adhesive compound coated onto the second side of each sticker is covered by an adhesive inhibiting tab having a length equal to the length of each sticker, and a width equal to or slightly greater than the width of the adhesive coated portion of the second side of each sticker. In the adhesive assembly of the invention, with the stickers in place upon the carrier medium, such adhesive inhibiting tabs are contiguously disposed to protect against premature adhesion. In the preferred embodiment the carrier medium is an elongate carrier tape and the adhesive assembly of the invention is preferably provided in roll containing a plurality of stickers, disposed in a box adapted to allow one end of the carrier tape, with stickers and tabs thereon, to be extended from the box while the balance of the rolled assembly remaining within the box, thus allowing a user to remove the stickers from the carrier tape one at a time.

In use of the invention to adhere a sheet of a drafting medium to a drafting board, one sticker for each corner or other desired point of attachment of the sheet of drafting medium is removed from the carrier medium, the adhesive inhibiting tab in place upon the second side of each sticker is removed, and each sticker adhered between the drafting board and each corner of the sheet of drafting medium. For most effective use, each sticker is placed such that the corner of each sticker nearest each respective corner of the drafting board will be aligned with the respective corner of the drafting medium and each sticker is fully covered by the sheet of drafting media when it is placed on the drafting board. Further, each sticker is positioned such that the first side of each sticker is in contact with the drafting board and the second side of each sticker is in contact with the sheet of drafting medium to be placed thereon. With the stickers in place and the sheet of drafting medium on the drafting board in its preselected position, a removeable attachment of the sheet of drafting medium to the drafting board is formed. Because the adhesive bond between each sticker and the drafting board is stronger than the adhesive bond between each sticker and the sheet of drafting medium, the drafting medium may be removed from the stickers without disturbing the position of the stickers on the drafting board.

The structure and features of the bilateral adhesive assembly and the method of use will be described in detail with reference to the accompanying drawing figures.

DETAILED DESCRIPTION OF THE INVENTION

Figure 1:
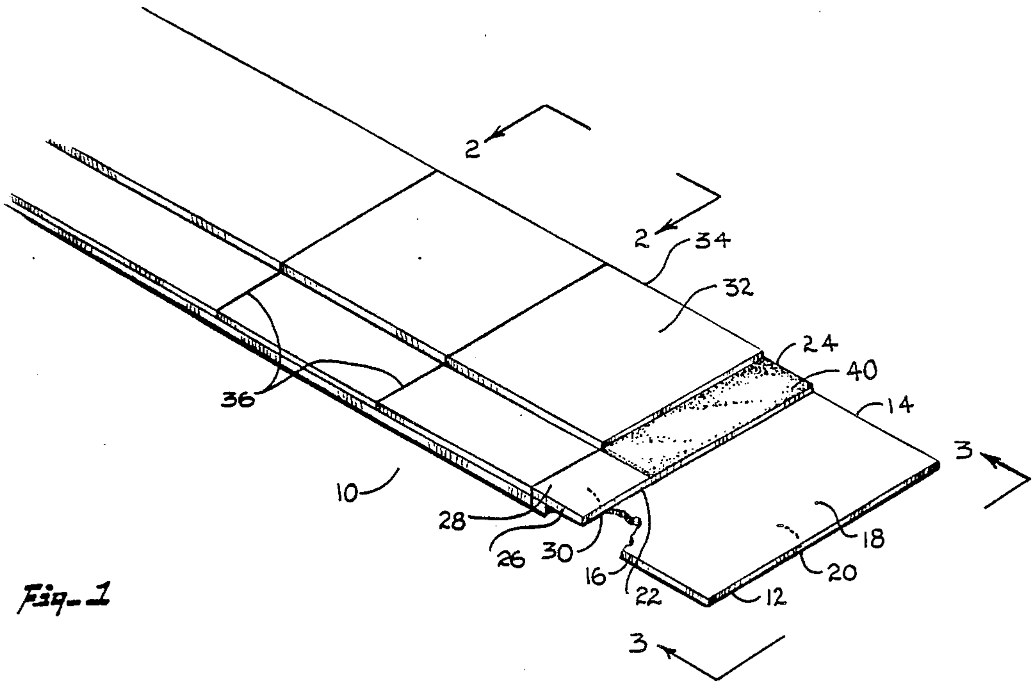
FIG. 1 is a perspective view of a section of the bilateral adhesive assembly of the invention, partially in sectional view.
Figure 2:
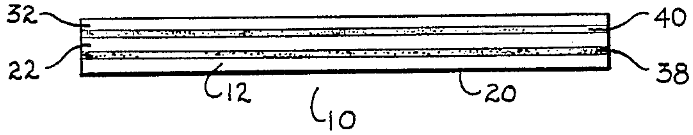
FIG. 2 is a diagrammatic elevation view of a section of the bilateral adhesive assembly of the invention along line 2—2 of FIG. 1, with component thickness exaggerated for clarity.
Figure 3:
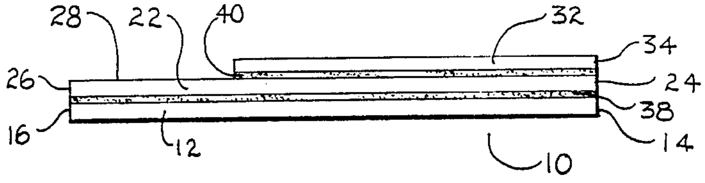
FIG. 3 is a diagramatic elevation view of the bilateral adhesive assembly of the invention along line 3—3 of FIG. 1, with component thickness exaggerated for clarity.

With reference now to FIG. 1, FIG. 2, and FIG. 3, the preferred embodiment of the bilateral adhesive assembly of the invention, generally designated by reference numeral 10, comprises an elongate continuous carrier tape 12 having a first edge 14 and a second edge 16, an upper face 18 and a lower face 20. In the preferred embodiment, carrier tape 12 comprises a paper substrate material coated with an adhesive retarding or inhibiting material on at least upper face 18, although other compositions of carrier type 12 having suitable adhesive inhibiting properties and tensile strength may readily be used. Adhesive assembly 10 further comprises a plurality of discrete stickers 22 each having a first edge 24 and a second edge 26, an upper face 28 and a lower face 30, and a plurality of discrete adhesive retarding or inhibiting tabs 32 with an edge 34. Stickers 22 and tabs 32 ae contiguously disposed along carrier tape 12 with first edge 24 of stickers 22 and edge 34 of tabs 32 aligned with first edge 14 of carrier tape 12, and with second edge 26 of stickers 22 aligned with second edge 16 of carrier tape 12. Stickers 22 and tabs 32 are sectionally subdivided on carrier tape 12 as indicated by lines of separation designated by reference numeral 36 in FIG. 1. Tabs 32 may be formed as a paper substrate with an adhesive retarding or inhibiting coating, or may be formed of a single material with adhesive retarding or inhibiting properties.

Each of stickers 22 is, in the preferred embodiment of the invention, substantially coated on lower face 30 with a pressure sensitive adhesive compound 38, and is partially coated on upper face 28 with a pressure sensitive adhesive compound 40. The respective formulations of adhesive compounds 38 and 40, and the degree of coverage of such adhesive compounds on faces 30 and 28, respectively, are adapted such that lower face 30 is capable of forming a stronger adhesive bond with another material than is upper face 28. In the preferred embodiment of the invention adhesive compounds 38 and 40 are at the same formulation and the coated surface area of lower face 30 is greater than the coated surface area of upper face 28, but different formulations with equal degrees of coating on the respective faces, or a combination of these approaches, may be used without departing from the scope of the invention. On both upper face 28 and lower face 30 the respective adhesive compound preferably extends from first edge 24 toward second edge 26 and fully across sticker 22 in the direction of the longitudinal axis of carrier tape 12. In the preferred embodiment, the same adhesive compound 38 and 40 extends over lower face 30 not less than approximately 75% of the width of sticker 22 from first edge 24 toward second edge 26, and extends over upper face 28 between 45% and 65% of the width of sticker 22 from first edge 24 toward second edge 26, but any degrees of incomplete coverage which will achieve firm, but unequal degrees of, adhesion to a drafting board and to a sheet of a drafting medium, respectively, may be used. In the preferred embodiment the omission of adhesive coating disposed from a small portion of lower face 30 at an edge of each of stickers 22 is to facilitate removal of stickers 22 from carrier tape 12 and to facilitate handling of stickers 22.

Figure 4:
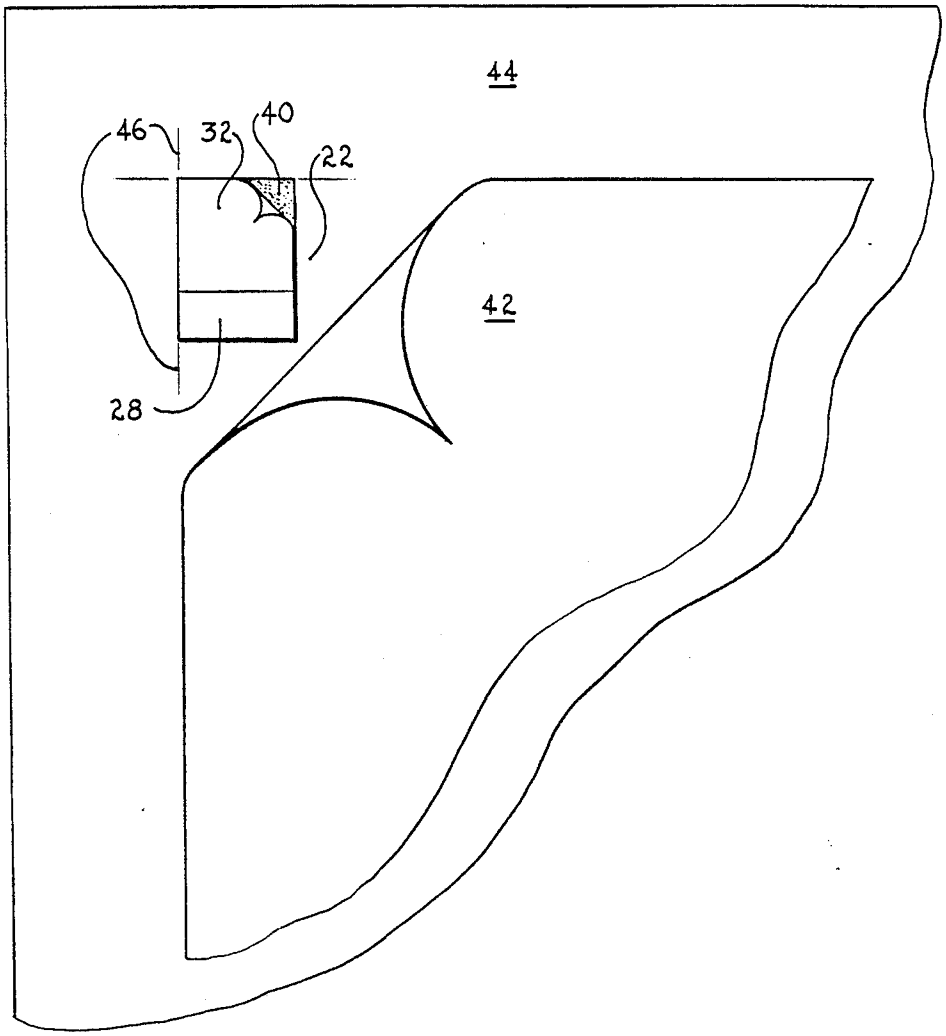
FIG. 4 is a plan view of one sticker and tab component of the bilateral adhesive assembly of the invention in place upon a drafting bond (partially shown) with a sheet of drafting medium (partially shown) in place upon the drafting board, illustrating the method of the invention.

The bilateral adhesive assembly of the invention is particularly useful for the purpose of adhering a sheet of a drafting medium, such as paper or drafting film, to a drafting board or drafting table. A method of use of the bilateral adhesive assembly of the invention for that purpose is illustrated by FIG. 4. It is preferred that the user first place a sheet 42 of a drafting medium on the drafting surface 44 to which it is to be adhered, position sheet 42 as desired and mark the location of the corners of sheet 42 on drafting surface 44, as with lines 46, to provide index points for the placement of stickers 22. A sticker 22 with tab 32 for each corner of sheet 42 of drafting medium is removed from carrier tape 12 and, through use of lines 46, is positioned on the drafting surface 44 with aligned edges 24 and 34 of each combined sticker 22 and tab 32 positioned to be in alignment with an edge of sheet 42 and with the corner of sticker 22 farthest from the center of the drafting surface 44 to be in alignment with the respective corner of sheet 42 to be placed thereon. Each sticker 22, with tab 32 still in place on upper surface 28 is pressed firmly onto the drafting surface 44 to activate the pressure sensitive adhesive coating 38 and firmly adhere sticker 22 to the drafting surface. Each tab 32 is then removed from upper face 28 of each sticker 22 to expose pressure sensitive adhesive coating 40 thereon, and sheet 42 is placed on drafting surface 44 and each corner of sheet 42 is pressed onto a sticker 22 to activate pressure sensitive adhesive coating 40. However, alternatives to the preferred sequence of steps may be employed within the scope of the invention, such as adhering upper face 28 of each sticker 22 to sheet 42 before forming the adhesive bond between lower face 30 and drafting surface 44. A removeable adhesive bond is formed between drafting surface 44 and stickers 22, and between stickers 22 and sheet 42, with flat stickers 22 fully covered by sheet 42, raising no impediment to the smooth passage of drafting instruments over the corner of sheet 42.

To remove sheet 42 from drafting surface 44, a flat lifting means, such as a flat instrument or a fingertip, is inserted between sheet 42 and drafting surface 44 adjacent to one of stickers 22, and that corner of sheet 42 is lifted to release the adhesive bond between that corner of sheet 42 and the respective sticker 22. The removal process is repeated at each of the other corners of sheet 42 to complete the removal of sheet 42. Because the adhesive coating 38 on lower surface 30 of each sticker 22 is of larger surface area than the adhesive coating 40 on upper surface 28, the adhesive bond between each sticker 22 and sheet 42 is released before release of the adhesive bond between each sticker 22 and drafting surface 44, and stickers 22 remain in place upon drafting surface 44 with removal of sheet 42. Therefore, each sticker 22 may be used several times before replacement is necessary, making the positioning of subsequently used sheets of the drafting medium more efficient.

The foregoing detailed description of the bilateral adhesive assembly and of the method of the invention is illustrative and not for purposes of limitation. The assembly and method of the invention are susceptible to various modifications and adaptations without departing from the scope and spirit of the invention as claimed.

What is claimed is:

1. A bilateral adhesive assembly comprising:

a thin carrier medium being substantially inhibiting to adhesive on at least one side thereof;

a plurality of discrete stickers each having a first face and a second face, said first face having a pressure sensitive adhesive coated on at least a portion thereof and said second face having a pressure sensitive adhesive coated on a portion thereof, such that an adhesive bond formed between said first face and a surface is of greater adhesive strength than an adhesive bond formed between said second face and said surface, said stickers being contiguously disposed on said carrier medium with said first face of each sticker in contact with the same adhesive inhibiting side thereof and releaseably interconnected thereto by means of the pressure sensitive adhesive compound coated on said first face; and a plurality of protective tabs being substantially inhibiting to adhesive on at least one side thereof, each of said tabs having approximately the same length and width dimensions as each of said stickers and being disposed over the pressure sensitive adhesive coated on said second face of one of said stickers with the adhesive inhibiting side of said protective tabs in contact with said pressure sensitive adhesive coated on said second face of said stickers, and releaseably interconnected thereto by means of the pressure sensitive adhesive compound coated on said second face of said stickers.

2. The bilateral adhesive assembly of claim 1 wherein said first face of each of said stickers is fully coated with said pressure sensitive adhesive compound.

3. The bilateral adhesive assembly of claim 1 wherein the pressure sensitive adhesive compound coated on said first face of each of said stickers covers a larger portion of said first face than the portion of said second face which is covered by the pressure sensitive adhesive coated on said second face.

4. The bilateral adhesive assembly of claim 1 wherein said thin carrier medium comprises an elongated carrier type.

5. The bilateral adhesive assembly of claim 1 wherein the pressure sensitive adhesive compound coated on the respective faces of said stickers is permanently adhered to said stickers and forms a firm but releaseable adhesive bond between said sticker and a material to which it is to be adhered.

6. The bilateral adhesive assembly of claim 1 wherein said thin carrier medium is an elongate carrier type, each of said stickers is disposed on said elongate carrier tape such that no portion of said first face coated with pressure sensitive adhesive compound extends beyond the edges of said elongate carrier type, the portion of said first face of each said sticker coated with pressure sensitive adhesive compound is of larger area than the portion of said second face of each said sticker coated with pressure sensitive adhesive compound, and the pressure sensitive adhesive compound coated on each of said faces is adapted to form a succession of releaseable adhesive bonds between said sticker and another material to which said sticker may be adhered.

7. A bilateral adhesive assembly useful for adhering a sheet of drafting or drawing media to a separate drawing board or drafting surface, comprising;

an elongate carrier tape being substantially inhibiting to adhesive on at least one side thereof;

a plurality of discrete thin stickers each having a first face and a second face, disposed on said carrier tape with said first face of each of said thin stickers facing the same adhesive inhibiting side of said carrier tape and releaseably interconnected thereto;

a first pressure sensitive adhesive compound coated onto not less than half the surface area of said first face of each of said thin stickers such that any uncoated portion of said first face of each of said thin stickers is immediately adjacent to one edge of said first face of such thin sticker, with said first pressure sensitive adhesive compound being permanently attached to said first face of each of said thin stickers and releaseably interconnnecting each of said thin stickers to said carrier tape;

a second pressure sensitive adhesive compound coated onto at least a portion of said second face of each of said thin stickers such that an adhesive bond formed between the coated second face of each of said thin stickers and another object is of lesser adhesive strength than an adhesive bond formed between the coated first face of each of said thin stickers and that same object; and a plurality of protective tabs being substantially inhibiting to adhesive on at least one side thereof, each of said protective tabs disposed over said second face of one of said thin stickers such that said protective tab covers at least the portion of said second face coated with said second pressure sensitive adhesive compound, and releaseably interconnected thereto.

8. The bilateral adhesive assembly of claim 7, wherein said first pressure sensitive adhesive compound and said second pressure sensitive adhesive compound are the same, and the portion of said second face of each of said thin stickers coated with pressure sensitive adhesive compound is of smaller surface area than the portion of said first face of each of said thin stickers coated with pressure sensitive adhesive compound.

9. The bilateral adhesive assembly of claim 8, wherein the pressure sensitive adhesive compound coated onto said second face of each of said thin stickers extends fully across the width of said second face of each of said thin stickers from a first end thereof toward the opposite, second end thereof, such that the uncoated portion of said second face of each of said thin stickers extends fully across the width of said second face from said second end of said thin sticker toward said first end.

10. The bilateral adhesive assembly of claim 9 wherein the portion of said first face of each of said thin stickers coated with pressure sensitive adhesive compound is within the range of approximately 75% to approximately 85% of the surface area of said first face, the portion of said second face of each of said thin stickers coated with pressure sensitive adhesive compound is within the range of approximately 45% to approximately 65% percent of the surface area of said second face, and the respective uncoated areas of said first and second faces extend fully across the width of the respective faces from said second end of each of said thin stickers toward said first end.

11. The bilateral adhesive assembly of claim 1, wherein the portion of said first face of each of said stickers coated with a pressure sensitive adhesive is equal to the portion of said second face of each of said stickers coated with a pressure sensitive adhesive, and wherein the pressure sensitive adhesive coated onto said first face is of a different formulation from the pressure sensitive adhesive coated onto said second face.

12. The bilateral adhesive assembly of claim 1, wherein the pressure sensitive adhesive compound coated onto said first face of said stickers and the pressure sensitive adhesive compound coated onto said second face of said stickers form a firm but releaseable adhesive bond between the respective faces of said stickers and a material to which each respective face is to be adhered, and are permanently adhered to the respective faces of said stickers whereby said stickers release from said material to which each respective face of said stickers is to be adhered without leaving a residue of adhesive compound on said material.

13. The bilateral adhesive assembly of claim 9, wherein said first pressure sensitive adhesive compound and said second pressure sensitive adhesive compound coated onto said first and second faces of each of said stickers form a firm but releaseable adhesive bond between said respective faces of said stickers and a surface to which said respective faces are adhered without any of said respective pressure sensitive adhesive compounds remaining on said surface upon release of said adhesive bond.

14. The bilateral adhesive assembly of claim 7, wherein said first pressure sensitive adhesive compound and said second pressure sensitive adhesive compound are adapted to form a succession of releaseable adhesive bonds between the respective faces of said stickers and a surface to which each of said faces may be adhered.

* * * * *